United States Patent
Liu et al.

(10) Patent No.: US 12,535,607 B2
(45) Date of Patent: Jan. 27, 2026

(54) METHOD AND SYSTEM FOR DETERMINING MIGRATION DATA USING MULTIBLOCK GATHERS

(71) Applicant: SAUDI ARABIAN OIL COMPANY, Dhahran (SA)

(72) Inventors: Yujin Liu, Beijing (CN); Hongwei Liu, Dhahran (SA); Song Han, Beijing (CN); Yue Du, Beijing (CN); Yi He, Beijing (CN); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 560 days.

(21) Appl. No.: 17/976,393

(22) Filed: Oct. 28, 2022

(65) Prior Publication Data

US 2024/0142649 A1 May 2, 2024

(51) Int. Cl.
*G01V 1/30* (2006.01)
*G01V 1/34* (2006.01)

(52) U.S. Cl.
CPC .............. *G01V 1/305* (2013.01); *G01V 1/345* (2013.01)

(58) Field of Classification Search
CPC ................................ G01V 1/305; G01V 1/345
See application file for complete search history.

(56) References Cited

U.S. PATENT DOCUMENTS

| | | |
|---|---|---|
| 4,611,312 A | 9/1986 | Ikeda |
| 4,766,574 A | 8/1988 | Whitmore et al. |
| 7,095,678 B2 | 8/2006 | Winbow et al. |
| 7,768,872 B2 | 8/2010 | Kappius et al. |
| 9,360,576 B2 | 6/2016 | Frjlink |
| 9,495,487 B2 | 11/2016 | Krebs et al. |
| 9,857,490 B2 | 1/2018 | Martinez |

(Continued)

FOREIGN PATENT DOCUMENTS

| | | |
|---|---|---|
| CN | 111965699 A | 11/2020 |
| CN | 113917533 A | 1/2022 |
| WO | 1997/000485 A1 | 1/1997 |

OTHER PUBLICATIONS

Teixeira, D. et al., "Implementation of Kirchhoff prestack depth migration on GPU", SEG Houston 2013 Annual Meeting, pp. 3683-3686, 2013 (4 pages).

(Continued)

*Primary Examiner* — Manuel A Rivera Vargas
(74) *Attorney, Agent, or Firm* — Osha Bergman Watanabe & Burton LLP

(57) ABSTRACT

A method may include obtaining seismic data regarding a geological region of interest. The seismic data may correspond to a seismic survey that is divided into various bins in a predetermined bin grid. The method may further include determining a first multiblock bin within the seismic survey. The first multiblock bin may correspond to a source bin and a receiver bin among the bins. The method may further include determining traveltime table data using the seismic data and various multiblock bins that include the first multiblock bin. The method further includes determining migrated data using the seismic data, the traveltime table data, a velocity model, a migration function, and various parallel processors. The method further includes generating a seismic image of the geological region of interest using the migrated data.

13 Claims, 6 Drawing Sheets

(56) References Cited

U.S. PATENT DOCUMENTS

| | | | |
|---|---|---|---|
| 11,231,511 B2 | 1/2022 | Wu et al. | |
| 2005/0143921 A1* | 6/2005 | Winbow | G01V 1/301 |
| | | | 702/14 |
| 2010/0074053 A1* | 3/2010 | Jaiswal | G01V 1/301 |
| | | | 367/73 |
| 2018/0372897 A1 | 12/2018 | Colombo et al. | |
| 2020/0132872 A1 | 4/2020 | Dossary et al. | |
| 2020/0183035 A1 | 6/2020 | Liu et al. | |
| 2022/0283329 A1 | 9/2022 | Zwartjes et al. | |
| 2022/0390632 A1* | 12/2022 | Liu | G01V 1/303 |
| 2023/0184972 A1* | 6/2023 | Colombo | G01V 1/306 |
| | | | 367/73 |
| 2024/0174007 A1* | 5/2024 | Ishidoya | B41J 2/32 |

OTHER PUBLICATIONS

Chang, H. et al., "3-D prestack Kirchhoff depth migration: From prototype to production in a massively parallel processor environment", Geophysics, vol. 63, No. 2, pp. 546-556, 1998 (11 pages).

Alkhalifah, T., "Efficient traveltime compression for 3D prestack Kirchhoff migration", Geophysical Prospecting, vol. 59, No. 1, pp. 1-9, 2011 (9 pages).

Rastogi, R. et al., "3D Kirchhoff depth migration algorithm: A new scalable approach for parallelization on multicore CPU based cluster", Computers & Geosciences, vol. 100, 2017 (20 pages).

J. Li et al., "Partitioning Algorithm of 3-D Prestack Parallel Kirchhoff Depth Migration for Imaging Spaces," 2009 Eighth International Conference on Grid and Cooperative Computing, pp. 276-280, 2009 (5 pages).

Sun, Y. et al., "3-D prestack Kirchhoff beam migration for depth imaging", Geophysics, vol. 65, No. 5, pp. 1592-1603, 2000 (12 pages).

Obregon, I. et al., "Reverse Time Migration on a GPU Cluster Using the Seismic Data Parallelism Strategy", SEG Global Meeting Abstracts, pp. 353-357, 2017 (5 pages).

First Examination Report issued in Saudi Arabian Application No. 123450668, dated Nov. 2, 2024 (9 pages).

\* cited by examiner

METHOD AND SYSTEM FOR DETERMINING MIGRATION DATA USING MULTIBLOCK GATHERS

BACKGROUND

Various seismic processing operations are performed on seismic data from a survey to convert time-based seismic data into a depth representation of a subsurface. For example, seismic processing operations may include surface multiple filtering and other noise removal operations. Likewise, seismic processing may also include application of seismic inversion techniques and migration algorithms to velocity models.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, seismic data regarding a geological region of interest. The seismic data corresponds to a seismic survey that is divided into various bins in a predetermined bin grid. The method further includes determining, by the computer processor, a first multiblock bin within the seismic survey. The first multiblock bin corresponds to a source bin and a receiver bin among the bins. The method further includes determining, by the computer processor, traveltime table data using the seismic data and various multiblock bins that include the first multiblock bin. The method further includes determining, by the computer processor, migrated data using the seismic data, the traveltime table data, a velocity model, a migration function, and various parallel processors. The method further includes generating, by the computer processor, a seismic image of the geological region of interest using the migrated data.

In general, in one aspect, embodiments relate to a system that includes a network that includes various parallel processors and a seismic interpreter that includes a computer processor. The seismic interpreter is coupled to the network. The seismic interpreter obtains seismic data regarding a geological region of interest. The seismic data corresponds to a seismic survey that is divided into various bins in a predetermined bin grid. The seismic interpreter determines a first multiblock bin within the seismic survey. The first multiblock bin corresponds to a source bin and a receiver bin among the bins. The seismic interpreter determines traveltime table data using the seismic data and various multiblock bins including the first multiblock bin. The seismic interpreter determines migrated data using the seismic data, the traveltime table data, a velocity model, a migration function, and various parallel processors. The seismic interpreter generates a seismic image of the geological region of interest using the migrated data.

In general, in one aspect, embodiments relate to a non-transitory computer readable medium storing instructions executable by a computer processor. The instructions obtain seismic data regarding a geological region of interest. The seismic data corresponds to a seismic survey that is divided into various bins in a predetermined bin grid. The instructions determine a first multiblock bin within the seismic survey, wherein the first multiblock bin corresponds to a source bin and a receiver bin among the bins. The instructions determine traveltime table data using the seismic data and various multiblock bins that include the first multiblock bin. The instructions determine migrated data using the seismic data, the traveltime table data, a velocity model, a migration function, and various parallel processors. The instructions generate a seismic image of the geological region of interest using the migrated data.

In some embodiments, the traveltime table data is determined using a ray tracing method, where the ray tracing method may be a fast marching method, a paraxial method, or a ray shooting method. In some embodiments, a first portion of traveltime table data and a first portion of the seismic data are transmitted by a computer processor to a first graphical processing unit (GPU). A second portion of the traveltime table data and a second portion of the seismic data are transmitted to a second GPU, where the first portion of the seismic data and the first portion of the seismic data are different. The migrated data includes a first migrated data portion that is determined by the first GPU and a second migrated data portion that is determined by the second GPU. In some embodiments, traveltime table data corresponds to one or more traveltime tables, and the one or more traveltime tables describe arrival times of one or more pressure waves at one or more imaging points in the geological region of interest. In some embodiments, various parallel processors perform a migration function based on various multiblock gathers, where at least one of the multiblock gathers corresponds to a respective seismic trace based on a respective seismic source location in the source bin and a respective receiver location in the receiver bin. In some embodiments, the migration function is a Kirchhoff migration function based on an integral form of a wave equation that corresponds to pressure wave displacement and a pressure wave velocity as function of three-dimensional space and time. In some embodiments, a presence of hydrocarbons is determined in a geological region of interest using a seismic image. In some embodiments, a tomographic update is determined using the migrated data. The velocity model may be updated using the tomographic update. In some embodiments, seismic data is acquired regarding the geological region of interest using a seismic surveying system.

In light of the structure and functions described above, embodiments of the invention may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
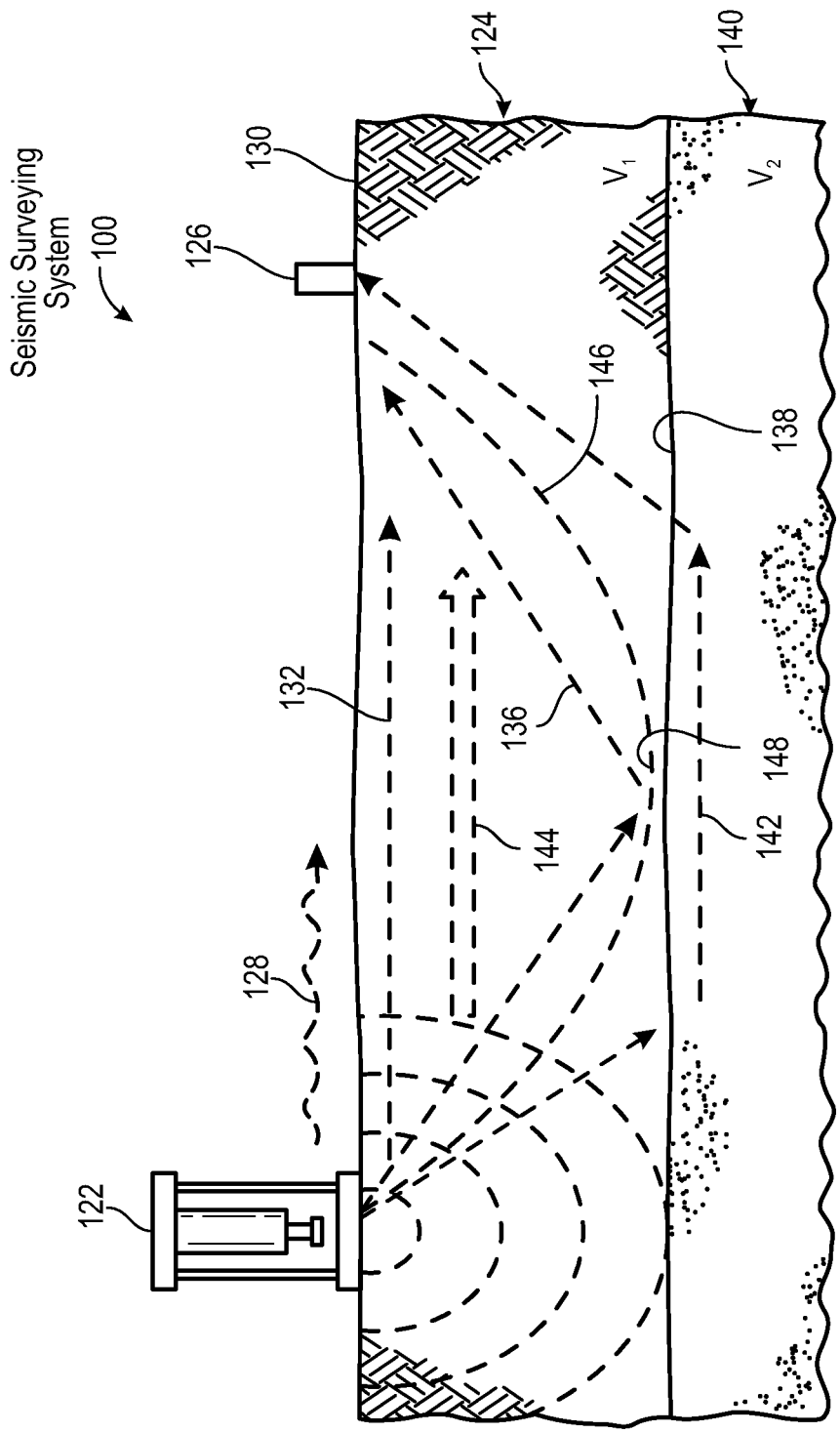
FIGS. 1, 2, and 3 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using multiblock bins and multiblock gathers to enhance the computational efficiency of a migration operation. For example, migration functions may be performed on seismic data using various parallel processors to reduce computational runtime, e.g., in a GPU/CPU hybrid platform. By having a central processing unit (CPU) and graphical processing units (GPUs) collaborate on the migration operation (e.g., based on a prestack depth (PSDM) algorithm, such as a 3D Kirchhoff migration algorithm), a bottleneck may be incurred when the migration operation is required read data from various traveltime tables from a hard disk. In particular, traveltime table data may be read to a CPU's memory and then the same traveltime table data may be distributed by the CPU to various GPU memories. Because the size of GPU memory may be limited, only a predetermined number of traveltime tables may be saved at one time to a particular GPU's memory.

Furthermore, in some embodiments, a multiblock gather based on a multiblock bin is used at a particular node (e.g., a respective GPU) in a parallel processing network to generate a portion of the migrated data in a migration operation. More specifically, various seismic sources and seismic receivers are sorted in multiblock bins. By arranging seismic traces according to respective multiblock bins, redundancy may be avoided in reading traveltime tables at a particular node for sources or receivers at close locations in the same receiver bin or source bin, respectively. Therefore, after computing traveltime tables for a seismic dataset, a particular node may only require traveltime table data for seismic sources and seismic receivers for the multiblock gathers being used to produce migrated data at the particular node.

In contrast, where seismic data is sorted in common shot gathers, e.g., in conventional Kirchhoff migration, all of the seismic receivers may be looped into the migration operation at a particular node to migrate the seismic data. In other words, a seismic trace from a source S1 to a receiver R1 may require four 3D traveltime tables in order to migrate the seismic trace. Thus, a source-receiver pair in a common shot gather may need the particular node to access eight total 3D traveltime tables at the bin grids to determine corresponding migrated data. This regular requirement for accessing traveltime tables may waste input/out (I/O) time in the migration operation by causing nodes in the parallel processing network to repeatedly access the same bin grids. For an illustrative example, if we have N seismic sources in one bin and M seismic receivers in another bin, using common shot gathers may need a particular node to access (4+4*M)*N traveltime tables. However, using multiblock gathers only need to access eight grid traveltime tables. Thus, multiblock gathers based on multiblock bins may reduce the I/O operations associated with using numerous traveltime tables.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), refracting wave (142), or diving wave (146), through a subsurface layer (124). Pressure waves generated by the seismic source (122) may travel along several paths through a subsurface layer (124) at a velocity $V_1$ for detection at a number of seismic receivers (126) along the line of profile. Likewise, velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a velocity $V_1$, while subsurface layer (140) has a velocity $V_2$. In words, different subsurface layers may correspond to different velocity values. In particular, a velocity may refer to the speed that a pressure wave travels through a medium, e.g., diving wave (146) that makes a curvilinear ray path (148) through subsurface layer (124). Velocity may depend on a particular medium's density and elasticity as well as various wave properties, such as the frequency of an emitted pressure wave. Where a velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the velocity $V_1$ through the subsurface layer (124) to the seismic receivers (126).

Turning to refracted pressure waves and diving pressure waves, the seismic source (122) may also generate a refracted wave (i.e., refracting wave (142)) that is refracted at the subsurface interface (138) and travels along the subsurface interface (138) for some distance as shown in FIG. 1 until traveling upwardly to the seismic receivers (126). As such, refracted pressure waves (e.g., refracted wave (142)) may be analyzed to map the subsurface layers (124, 140). For example, a refracted wave is a wave that a portion of ray path is along an interface of a reflector as show in refracting wave (142) in FIG. 1 (i.e., refraction exists only when $V_2>V_1$). On the other hand, a diving wave may be generated where velocities are gradually increasing with depth at a gradient (e.g., diving wave (146)), such that the diving wave may turn back along curvilinear ray path. Likewise, the apex of a diving wave may be consistent with a reflected seismic wave in a common midpoint (CMP) gather.

Furthermore, in analyzing seismic data acquired using the seismic surveying system (100), seismic wave propagation may be approximated using rays. For example, reflected waves (e.g., reflected wave (136)) and diving waves (e.g., diving wave (146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a minimum that satisfies a predetermined criterion. For example, the optimization algorithm may be "linearized" and while achieving a "minimum", there may be no guarantee that it is a global minimum rather than a local minimum. Thus, it may be a simplification commonly adapted in solving inverse problems that works when a respective objective function is convex.

With respect to velocity models, a velocity model may map various subsurface layers based on velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
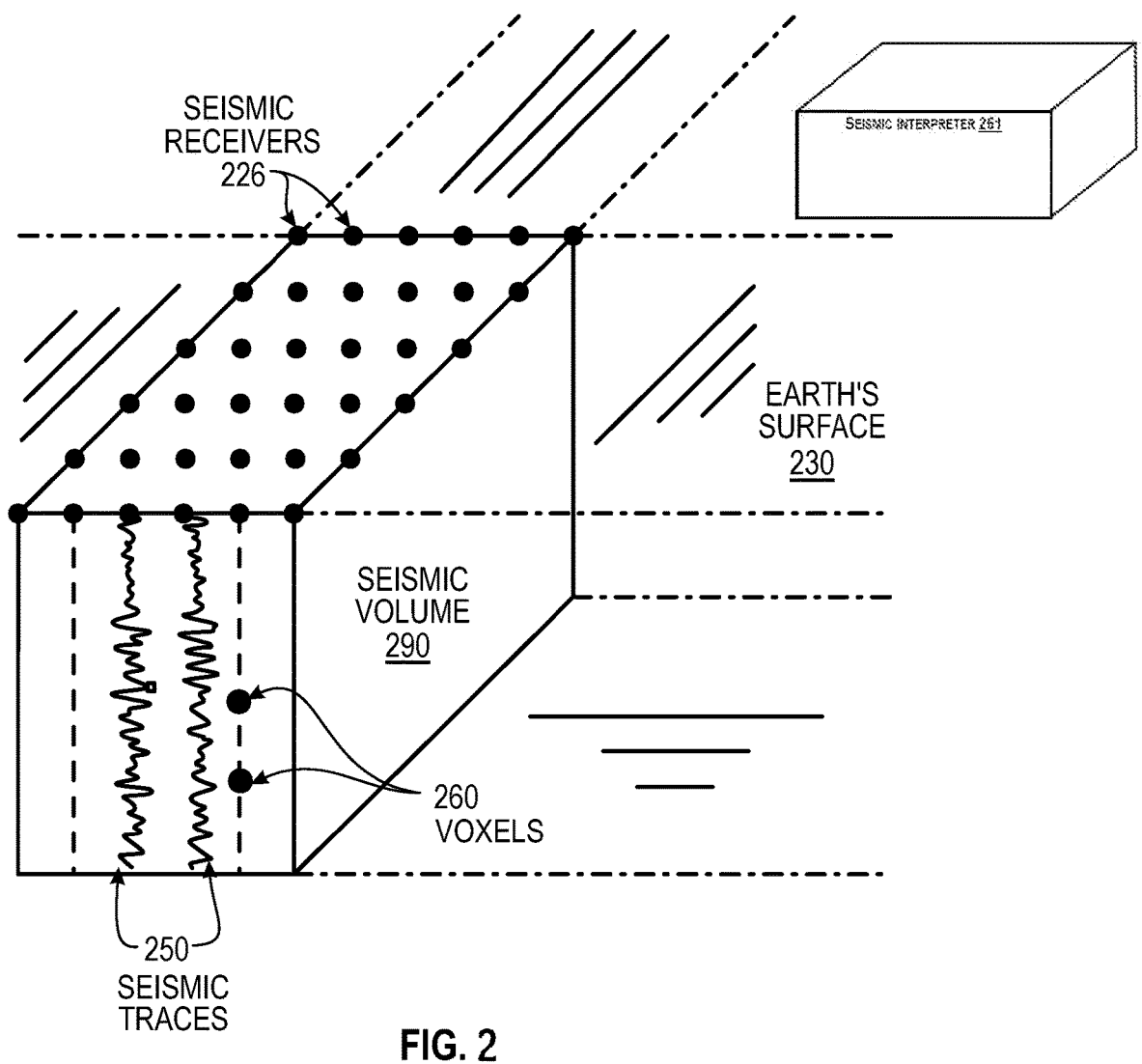

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave traveltimes and derive traveltime estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot-Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field.

In Kirchhoff and other migration methods, for example, the imaging condition may include a summation of contributions resulting from the input data traces after the traces have been spread along portions of various isochrones (e.g., using principles of constructive and destructive interference to form the image). For example, Kirchhoff migration function may be based on an integral form of a wave equation that corresponds to pressure wave displacement and a pressure wave velocity as function of three-dimensional space and time. As such, 3D prestack Kirchhoff depth migration may be characterized as the summation of various reflection amplitudes along diffraction traveltime curves to obtain the output seismic images. As such, Kirchhoff algorithms may preprocessing input seismic traces, determine traveltime tables for pressure waves using ray-tracing and a velocity model, and migrate these seismic traces. Besides Kirchhoff algorithms, other migration functions are also contemplated such as finite-difference migration, frequency-space migration, and frequency-wavenumber migration, and Stolt migration.

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, normal moveout corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Additionally, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection traveltimes.

Turning to the seismic interpreter (261), a seismic interpreter (261) (also called a "seismic processing system") may include hardware and/or software with functionality for storing the seismic volume (290), well logs, core sample data, and other data for seismic data processing, well data processing, and other data processes accordingly. In some embodiments, the seismic interpreter (261) may include a computer system that is similar to the computer (702) described below with regard to FIG. 7 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Figure 3:
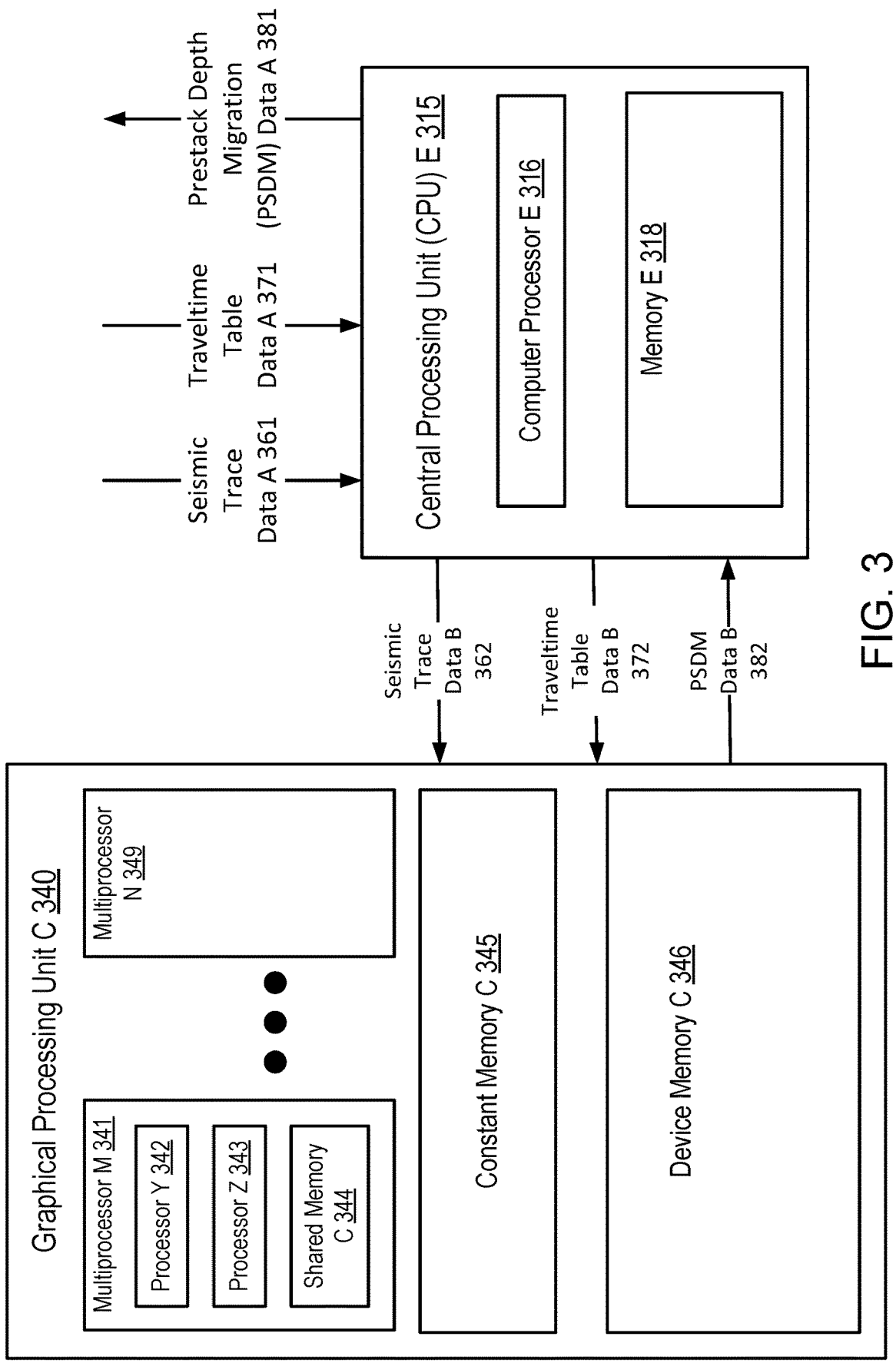

Turning to FIG. 3, FIG. 3 shows a schematic diagram in accordance with one or more embodiments. As illustrated in FIG. 3, a central processing unit (CPU) (e.g., CPU E (315)) may be coupled to one or more graphical processing units (e.g., graphical processing unit (GPU) C (340)) to perform one or more seismic data processing operations, e.g., one or more migration functions. In particular, a GPU may include various hardware, such as a set of multiprocessors (e.g., multiprocessor M (341), multiprocessor N (349)), where a respective multiprocessor may include multiple individual processors (e.g., processor Y (342), processor Z (343), which may be referred to as "cores"), and one or more shared memories (e.g., shared memory C (344)). As such, a GPU may perform a specific seismic operation that may be referred to as a "kernel" that is performed using multiple hardware threads operating in parallel. For example, a GPU may execute the kernel using one or more thread blocks, where a thread block includes a group of single instruction, multiple data (SIMD) threads. As such, multiple thread blocks may be executed by a single multiprocessor concurrently on a GPU. Thus, GPUs may include functionality for accelerating image generation, which may also make GPUs suitable hardware for executing parallel processing in order to perform seismic data operations that include complex computations. A processor may be a parallel processor and similar to the processor (705) described below in FIG. 7 and the accompanying description. In particular, the term "parallel processor" may refer to multiprocessors, individual processors, and computer processors that operate in parallel in a processing operation.

In some embodiments, a seismic interpreter is the CPU and uses one or more GPUs (e.g., GPU C (340)) to determine migration data (e.g., prestack depth migration (PSDM) data A (381)) using a migration algorithm or migration function. In regard to CPU E (315), for example, the CPU E (315) includes a computer processor E (316) and a memory (318) that stores all or a portion of seismic trace data A (361) and traveltime table data A (371). As such, the CPU E (315) may transmit a portion of the seismic trace data A (361) and the traveltime table data A (371) to the GPU C (340) or to another GPU, e.g., as a portion of the input data to a migration algorithm. Likewise, the CPU E (315) may also obtain PSDM data from various GPUs (e.g., PSDM data B (382) from GPU C (340) in response to transmitting seismic trace data B (362) and traveltime table data B (372)). While traveltime data is shown being transmitted to the CPUE E (315) in FIG. 3 (e.g., from a hard disk), in some embodiments, the CPU E (315) determines all or a portion of the traveltime table data using seismic data and one or more ray tracing methods. After collecting PSDM data from the GPUs performing the migration algorithm or migration function, the CPU E (315) may transmit the results to an external source for storage and/or analysis.

Returning to GPUs, a GPU may include different types of memory hardware, such as register memory, shared memory, device memory, constant memory, texture memory, etc. For example, register memory and shared memory (e.g., shared memory C (344)) may be disposed on an actual GPU chip, while other types of memory may be separate components in the GPU. In particular, register memory may only be accessible to the hardware thread that wrote its memory values, which may only last throughout the respective thread's lifetime. On the other hand, shared memory may be accessible to all hardware threads within a thread block and shared memory values may exist for the duration of the thread block (e.g., shared memory enables hardware threads to communicate and share data between one another). Device memory (e.g., device memory C (346)) may be global memory that is accessible to any hardware threads within a GPU's application as well as devices outside the GPU, such as a seismic interpreter or seismic processing system. Device memory may be allocated by a host for example, and may survive until the host deallocates the memory. Constant memory (e.g., constant memory C (345)) may be a read-only memory device that provides memory values that do not change over the course of a kernel execution (e.g., constant memory may provide data faster than device memory and thus reduce memory bandwidth). Texture memory (not shown) may be another read-only memory device that is similar to constant memory, where the memory reads in texture memory may be limited to physically adjacent hardware threads, e.g., those hardware threads in a warp.

In some embodiments, multiple GPUs, a central processing unit, and/or one or more seismic interpreters may communicate with each other using a peer-to-peer (P2P) communication protocol. For example, two GPUs may be attached to the same PCIe bus in a seismic interpreter and communicate directly with each other. Thus, over a P2P communication protocol, a component in a seismic interpreter may access a different memory in another GPU or CPU. In some embodiments, for example, the CPU E (315) may not store locally the PSDM A (381), but may simply access the device memory C (346) in the GPU C (340) that stores a portion of the PSDM A (381). Likewise, the P2P communication protocol may also enable direct memory transfers between system components.

While FIGS. 1, 2, and 3 show various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
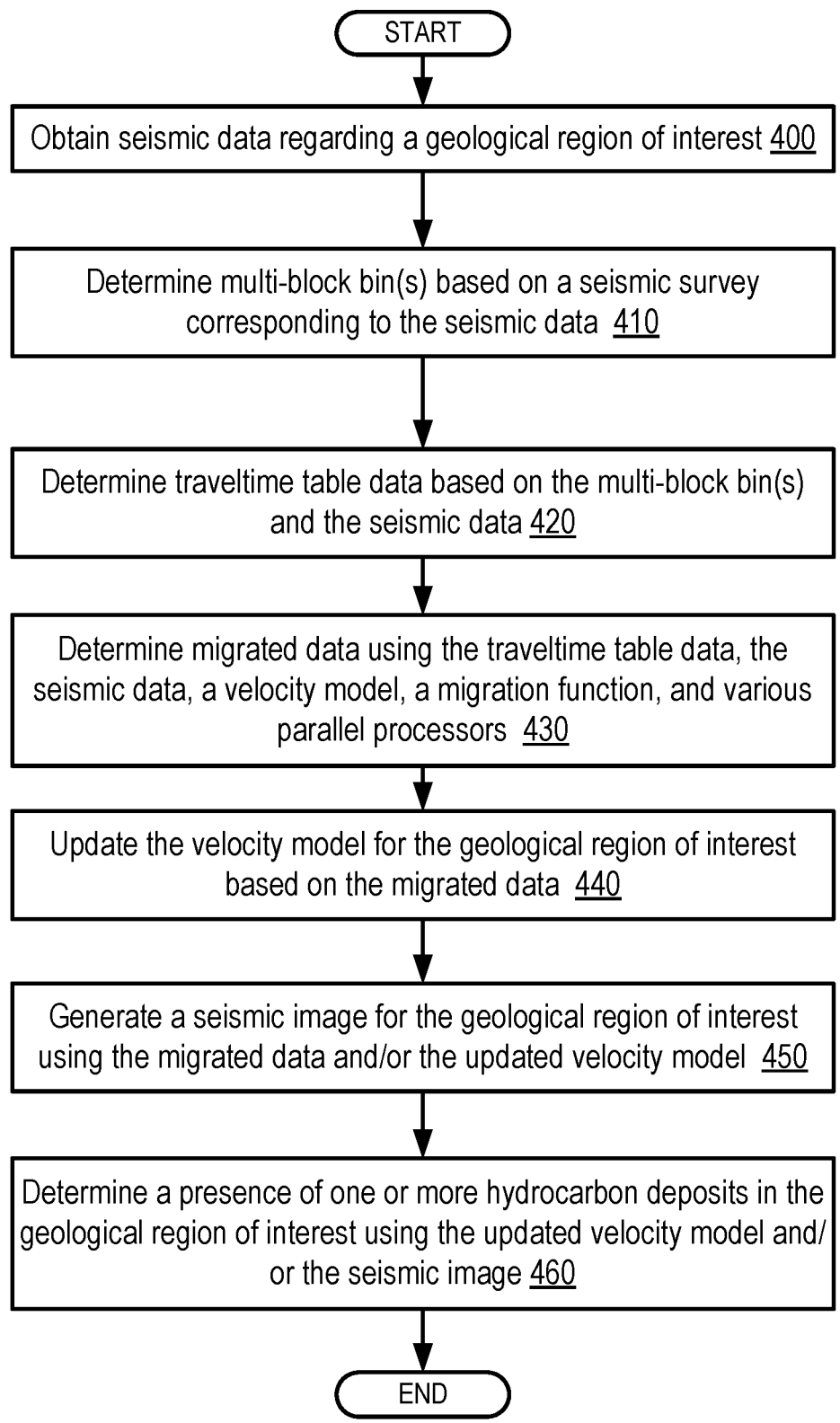
FIG. 4 shows a flowchart in accordance with one or more embodiments.

Turning to FIG. 4, FIG. 4 shows a flowchart in accordance with one or more embodiments. Specifically, FIG. 4 describes a general method for determining and/or using migration data based on multiblock gathers. One or more blocks in FIG. 4 may be performed by one or more components (e.g., seismic interpreter (261)) as described in FIGS. 1 2, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, seismic data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data described above in FIGS. 1 and 2 and the accompanying description.

In Block 410, one or more multiblock bins are determined based on a seismic survey corresponding to seismic data in accordance with one or more embodiments. In particular, a multiblock bin may identify a source location in a respective source bin within a seismic survey and one or more receiver locations in a respective receiver bin. Using multiblock bins, a particular node in a parallel processing network may determine all the source-receiver pairs for determining migrated data based on a corresponding multiblock bin gather (i.e., a gather of seismic traces based on the source-receiver pairs).

In some embodiments, various seismic traces are sorted according to multiblock bins to reduce computational costs and enhance the I/O efficiency associated with one or more migration functions. Though this association of source-receiver pairs, a seismic interpreter may manage access to various traveltime tables among bin grids. As such, various receiver bins may be looped with respective source bins to form different multiblock gathers for migrating seismic traces.

Figure 5:
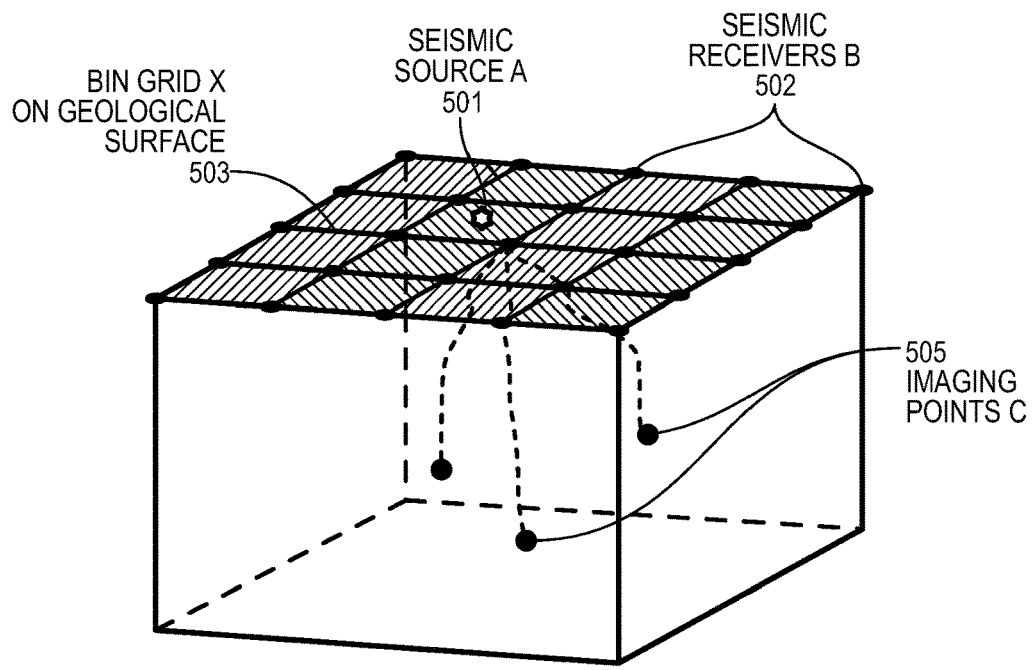
FIGS. 5 and 6 show examples in accordance with one or more embodiments.

Turning to FIG. 5, FIG. 5 illustrates a schematic plot of traveltime calculations using various bin grid locations on a surface of a geological region of interest. As shown in FIG. 5, a bin grid X (503) divides a geological surface among various seismic receivers B (502) and a seismic source A (501). In particular, the bid grid X (503) may be divided into various multiblock bins such that various image points C (505) are determined using the multiblock bins for multiple subsurface locations in the 3D image field domain. In FIG. 5, the bin grid X (503) is at the same surface as the seismic sources and seismic receivers.

Figure 6:
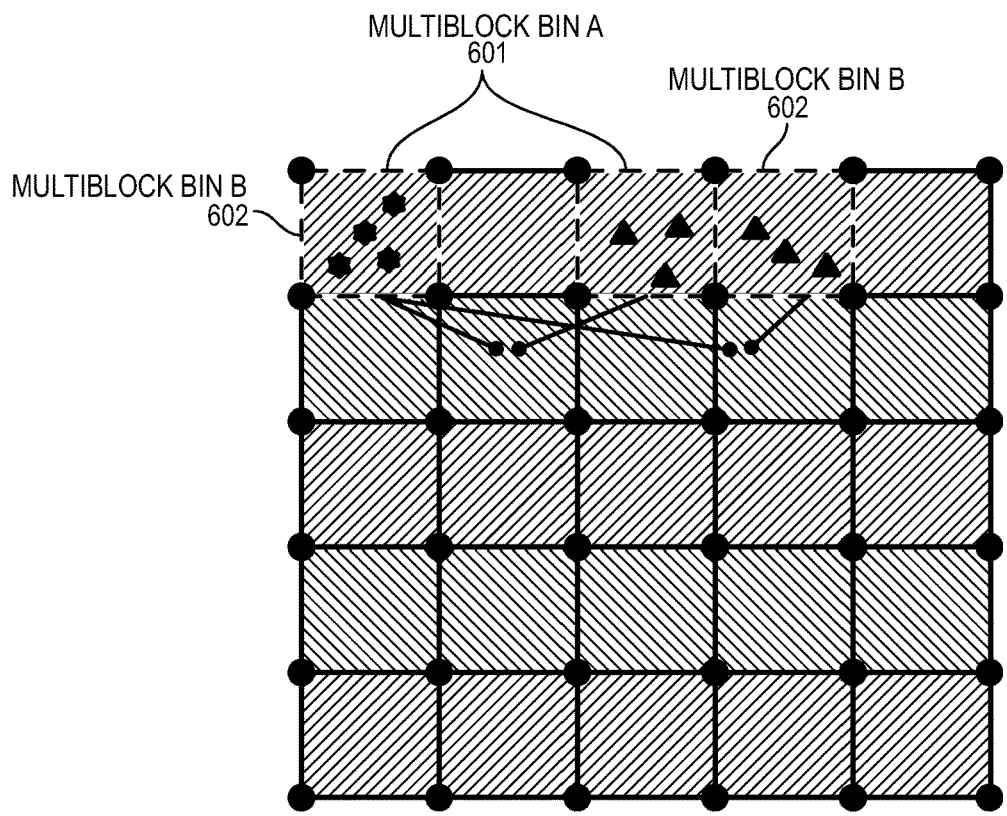

Turning to FIG. 6, FIG. 6 illustrates various multiblock gathers based on various multiblock bins in accordance with one or more embodiments. In FIG. 6, a seismic trace in a multiblock gather may correspond to a seismic source location in a source bin and a receiver location in a receiver bin. Thus, a multiblock gather may include seismic traces for respective seismic sources (e.g., the stars in FIG. 6) in the source bin that correspond to all receivers (e.g., the triangles in FIG. 6) in a respective receiver bin. For example, after determining source-receiver pairs in multiblock bin A (601) and multiblock bin B (602), only 8 3D traveltime tables may be accessed for the corresponding bin grid. Then, for seismic sources in one bin, the receiver bins may be looped to form different multiblock gathers to migrate the seismic traces using a migration function.

Returning to FIG. 4, in Block 420, one or more traveltime tables are determined based on one or more multiblock bins and seismic data in accordance with one or more embodiments. In some embodiments, for example, a traveltime table may include one or more arrays of one-way traveltimes from various seismic sources and receiver locations to various imaging points. The traveltime table may be associated with a bin grid that corresponds spatially to a desired migrated image for a geological region of interest. As such, a traveltime table may identify different arrival times (e.g., an initial arrival time and a final arrival time) of pressure waves at image points within a seismic survey.

Furthermore, a traveltime table may be determined using input source locations, input receiver locations, input seismic data, and one or more ray tracing methods. Examples of ray-tracing methods may include a fast marching method, a paraxial method, and a ray shooting method. In a ray shooting method, for example, traveltimes may be determined along ray paths by integrating through a velocity model, and subsequently mapping the computed traveltimes to a subsurface grid by interpolation. Likewise, ray-tracing methods may be based on one or more ray equations, such as wavefront equations, the Eikonal equation, etc.

In some embodiments, the traveltime tables are determined by a parallel-processing network that includes a GPU cluster (i.e., multiple GPUs) and one or more CPUs. For example, the traveltime tables are determined by a seismic interpreter (i.e., as the CPU for a seismic data processing operation) and then transferred through the parallel-processing network to one or more GPUs.

In Block 430, migrated data is determined using one or more traveltime tables, seismic data, a velocity model, a migration function, and various parallel processors in accordance with one or more embodiments. After traveltime tables are obtained, a migration function may be performed on the seismic data using a velocity model and various parallel processors. For example, the migration function may correspond to one or more Kirchhoff migration techniques, while the parallel processors may correspond to processors inside multiple GPUs.

In some embodiments, different portions of a seismic dataset are transferred to various GPUs within a parallel-processing network. The different portions of the seismic dataset are then transformed using the migration algorithm into migrated data. The migration itself may be computationally intensive and so may be performed completely using only GPUs. However, post-processing of the migrated data and writing the migrated to a hard disk may be performed by a CPU, such as a seismic interpreter.

In Block 440, a velocity model is updated for a geological region of interest based on migrated data in accordance with one or more embodiments. For example, the migrated data may be used to determine a tomographic update for the velocity model. Using the tomographic update, the velocity model may be updated accordingly.

In Block 450, a seismic image is generated for a geological region of interest using migrated data and/or an updated velocity model in accordance with one or more embodiments. For example, a set of migrated gathers may be summed or stacked to produce a final seismic image. In some embodiments, the seismic image provides a spatial and depth illustration of a subsurface formation for various practical applications, such as predicting hydrocarbon deposits, predicting wellbore paths for geosteering, etc.

In Block 460, a presence of one or more hydrocarbon deposits are determined in a geological region of interest using an updated velocity model and/or a seismic image in accordance with one or more embodiments.

Computer System

Figure 7:
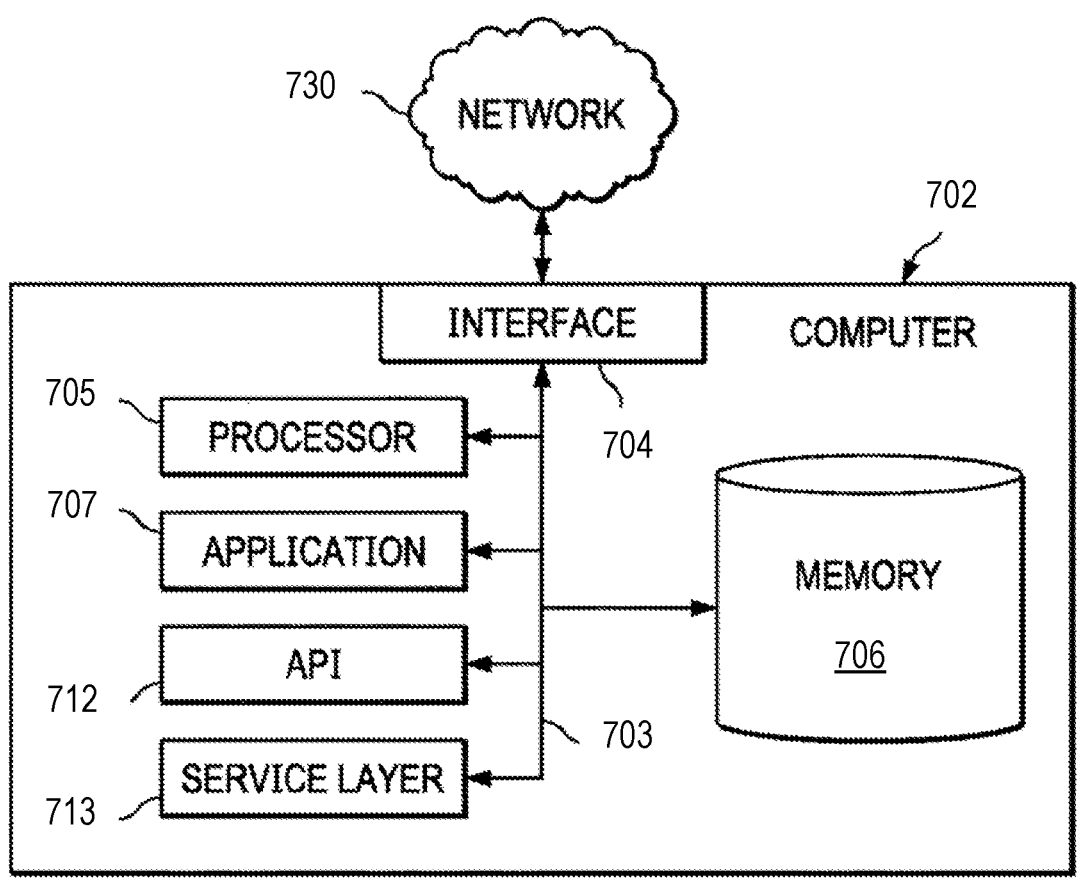
FIG. 7 shows a computing system in accordance with one or more embodiments.

Embodiments may be implemented on a computer system. FIG. 7 is a block diagram of a computer system used to provide computational functionalities associated with described algorithms, methods, functions, processes, flows, and procedures as described in the instant disclosure, according to an implementation. The illustrated computer (702) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730) or cloud. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) or cloud from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730) or cloud. More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

In some embodiments, the computer (702) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
  obtaining, by a central processing unit (CPU) in a parallel-processing network, seismic data regarding a geological region of interest, wherein the seismic data corresponds to a seismic survey that is divided into a plurality of bins in a predetermined bin grid,
  wherein the parallel-processing network comprises a first memory coupled to the CPU, a plurality of graphics processing units (GPUs), and a plurality of memories coupled to the plurality of GPUs;
  determining, by the CPU, a first multiblock bin within the seismic survey, wherein the first multiblock bin corresponds to a source bin and a receiver bin among the plurality of bins;
  determining, by the CPU, traveltime table data and a plurality of multiblock gathers using the seismic data and a plurality of multiblock bins comprising the first multiblock bin, wherein the traveltime table data and the plurality of multiblock gathers are read by the first memory coupled to the CPU;

transmitting, by the CPU, a first portion of the traveltime table data and a first multiblock gather among the plurality of multiblock gathers to a second memory coupled to a first GPU among the plurality of GPUs in the parallel-processing network;

transmitting, by the CPU, a second portion of the traveltime table data and a second multiblock gather among the plurality of multiblock gathers to a third memory coupled to a second GPU among the plurality of GPUs in the parallel-processing network;

generating, by the first GPU with parallel processing, first migrated data using a migration function using the first portion of the traveltime table data, the first multiblock gather, and a velocity model;

generating, by the second GPU with parallel processing, second migrated data using the migration function using the second portion of the traveltime table data, the second multiblock gather, and the velocity model;

obtaining, by the CPU and from the plurality of GPUs, a migrated dataset comprising the first migrated data and the second migrated data;

generating, by the CPU, a seismic image of the geological region of interest using the migrated dataset; and determining, using the CPU, a presence of one or more hydrocarbon deposits in the geological region of interest using the seismic image.

2. The method of claim 1, further comprising:
determining the traveltime table data using a ray tracing method,
wherein the ray tracing method is selected from a group consisting of a fast marching method, a paraxial method, and a ray shooting method.

3. The method of claim 1,
wherein the traveltime table data corresponds to one or more traveltime tables, and
wherein the one or more traveltime tables describe arrival times of one or more pressure waves at one or more imaging points in the geological region of interest.

4. The method of claim 1,
wherein the migration function is a Kirchhoff migration function based on an integral form of a wave equation that corresponds to pressure wave displacement and a pressure wave velocity as function of three-dimensional space and time.

5. The method of claim 1, further comprising:
determining a tomographic update using the migrated dataset; and
updating the velocity model using the tomographic update.

6. The method of claim 1, further comprising:
acquiring, using a seismic surveying system, the seismic data regarding the geological region of interest.

7. A system, comprising:
a parallel-processing network comprising:
a plurality of graphics processing units (GPUs);
a seismic interpreter comprising a central processing unit (CPU), wherein the seismic interpreter is coupled to the parallel-processing network;
a first memory coupled to the CPU; and
a plurality of memories coupled to the plurality of GPUs
wherein the parallel-processing network is configured to perform a method comprising:
obtaining, by the CPU, seismic data regarding a geological region of interest, wherein the seismic data corresponds to a seismic survey that is divided into a plurality of bins in a predetermined bin grid;

determining, by the CPU, a first multiblock bin within the seismic survey, wherein the first multiblock bin corresponds to a source bin and a receiver bin among the plurality of bins;

determining, by the CPU, traveltime table data and a plurality of multiblock gathers using the seismic data and a plurality of multiblock bins comprising the first multiblock bin, wherein the traveltime table data and the plurality of multiblock gathers are read by the first memory coupled to the CPU;

transmitting, by the CPU, a first portion of the traveltime table data and a first multiblock gather among the plurality of multiblock gathers to a second memory coupled to a first GPU among the plurality of GPUs in the parallel-processing network;

transmitting, by the CPU, a second portion of the traveltime table data and a second multiblock gather among the plurality of multiblock gathers to a third memory coupled to a second GPU among the plurality of GPUs in the parallel-processing network;

generating, by the first GPU with parallel processing, first migrated data using a migration function using the first portion of the traveltime table data, the first multiblock gather, and a velocity model;

generating, by the second GPU with parallel processing, second migrated data using the migration function using the second portion of the traveltime table data, the second multiblock gather, and the velocity model;

obtaining, by the CPU and from the plurality of GPUs, a migrated dataset comprising the first migrated data and the second migrated data;

generating, by the CPU, a seismic image of the geological region of interest using the migrated dataset; and determining, using the CPU, a presence of one or more hydrocarbon deposits in the geological region of interest using the seismic image.

8. The system of claim 7, wherein the method further comprises:
determining the traveltime table data using a ray tracing method,
wherein the ray tracing method is selected from a group consisting of a fast marching method, a paraxial method, and a ray shooting method.

9. The system of claim 7,
wherein the traveltime table data corresponds to one or more traveltime tables, and
wherein the one or more traveltime tables describe arrival times of one or more pressure waves at one or more imaging points in the geological region of interest.

10. The system of claim 7,
wherein the migration function is a Kirchhoff migration function based on an integral form of a wave equation that corresponds to pressure wave displacement and a pressure wave velocity as function of three-dimensional space and time.

11. The system of claim 7, wherein the method further comprises:
determining a tomographic update using the migrated dataset; and
updating the velocity model using the tomographic update.

12. The system of claim 7, further comprising:
a seismic surveying system, wherein the seismic surveying system comprises at least one seismic source and a plurality of seismic receivers, wherein the seismic surveying system acquires the seismic data.

13. A non-transitory computer readable medium storing instructions executable by a computer processor, the instructions being configured to perform a method comprising:
obtaining, by a central processing unit (CPU) in a parallel-processing network, seismic data regarding a geological region of interest, wherein the seismic data corresponds to a seismic survey that is divided into a plurality of bins in a predetermined bin grid,
wherein the parallel-processing network comprises a first memory coupled to the CPU, a plurality of graphics processing units (GPUs), and a plurality of memories coupled to the plurality of GPUs;
determining, by the CPU, a first multiblock bin within the seismic survey, wherein the first multiblock bin corresponds to a source bin and a receiver bin among the plurality of bins;
determining, by the CPU, traveltime table data and a plurality of multiblock gathers using the seismic data and a plurality of multiblock bins comprising the first multiblock bin, wherein the traveltime table data and the plurality of multiblock gathers are read by the first memory coupled to the CPU;
transmitting, by the CPU, a first portion of the traveltime table data and a first multiblock gather among the plurality of multiblock gathers to a second memory coupled to a first GPU among the plurality of GPUs in the parallel-processing network;
transmitting, by the CPU, a second portion of the traveltime table data and a second multiblock gather among the plurality of multiblock gathers to a third memory coupled to a second GPU among the plurality of GPUs in the parallel-processing network;
generating, by the first GPU with parallel processing, first migrated data using a migration function using the first portion of the traveltime table data, the first multiblock gather, and a velocity model;
generating, by the second GPU with parallel processing, second migrated data using the migration function using the second portion of the traveltime table data, the second multiblock gather, and the velocity model;
obtaining, by the CPU and from the plurality of GPUs, a migrated dataset comprising the first migrated data and the second migrated data;
generating, by the CPU, a seismic image of the geological region of interest using the migrated dataset; and
determining, using the CPU, a presence of one or more hydrocarbon deposits in the geological region of interest using the seismic image.

* * * * *